US011431959B2

(12) United States Patent
Tan (10) Patent No.: US 11,431,959 B2
(45) Date of Patent: Aug. 30, 2022

(54) OBJECT CAPTURE AND ILLUMINATION (71) Applicant: Hewlett-Packard Development Company. L.P., Houston, TX (US)

(72) Inventor: Kar-Han Tan, Sunnyvale, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 763 days.

(21) Appl. No.: 15/500,463

(22) PCT Filed: Jul. 31, 2014

(86) PCT No.: PCT/US2014/049299
§ 371 (c)(1),
(2) Date: Jan. 30, 2017

(87) PCT Pub. No.: WO2016/018413
PCT Pub. Date: Feb. 4, 2016

(65) Prior Publication Data
US 2017/0223342 A1  Aug. 3, 2017

(51) Int. Cl.
H04N 13/00 (2018.01)
G06F 3/042 (2006.01)
H04N 13/296 (2018.01)
G01B 11/24 (2006.01)
H04N 13/254 (2018.01)

(52) U.S. Cl.
CPC ........... *H04N 13/296* (2018.05); *G01B 11/24* (2013.01); *G06F 3/042* (2013.01); *H04N 13/254* (2018.05)

(58) Field of Classification Search
CPC .... H04N 13/296; H04N 13/254; H04N 13/02; G06F 3/042; G01B 11/24

USPC .......................................................... 348/46
See application file for complete search history.

(56) References Cited

U.S. PATENT DOCUMENTS

| 7,599,561 | B2 | 10/2009 | Wilson et al. |
| 7,710,391 | B2 | 5/2010 | Bell et al. |
| 8,121,640 | B2 | 2/2012 | Russ et al. |
| 8,199,117 | B2 | 6/2012 | Izadi et al. |
| 8,224,064 | B1* | 7/2012 | Hassebrook ....... G01B 11/2513 382/154 |
| 8,717,423 | B2* | 5/2014 | Vesely ................... G06T 15/20 345/419 |
| 8,736,583 | B2 | 5/2014 | Anderson et al. |
| 8,754,887 | B2* | 6/2014 | Kuffner, Jr .............. G06T 19/20 345/419 |
| 2005/0078092 | A1 | 4/2005 | Clapper |
| 2008/0018591 | A1 | 1/2008 | Pittel et al. |
| 2009/0033910 | A1 | 2/2009 | Elie et al. |
| 2010/0302247 | A1 | 12/2010 | Perez et al. |

(Continued)

OTHER PUBLICATIONS

Krainin et al., "Manipulator and Object Tracking for In-Hand 3D Object Modeling," Apr. 6, 2011, pp. 1-34, <cs.washington.edu/.

(Continued)

*Primary Examiner* — Susan E. Hodges
(74) *Attorney, Agent, or Firm* — HP Inc. Patent Department (57) ABSTRACT

According to one example for capturing three-dimensional data of an object, illumination of an object is initiated, the object is scanned with a sensor, and a 3D representation of the object is created. Illumination of the object may comprise illumination of a surface of the object within a field of view of the sensor.

17 Claims, 11 Drawing Sheets

(56) References Cited

U.S. PATENT DOCUMENTS

| | | | |
|---|---|---|---|
| 2011/0102538 A1 | 5/2011 | Tan | |
| 2011/0242054 A1 | 10/2011 | Tsu | |
| 2011/0279648 A1* | 11/2011 | Lutian | G01S 17/89 |
| | | | 348/46 |
| 2012/0281240 A1* | 11/2012 | Cohen | G06K 9/2036 |
| | | | 356/610 |
| 2012/0306876 A1 | 12/2012 | Shotton et al. | |
| 2013/0077236 A1 | 3/2013 | Becze et al. | |
| 2013/0222551 A1* | 8/2013 | Shamir | G01B 11/25 |
| | | | 348/47 |
| 2014/0139668 A1 | 5/2014 | Short | |
| 2014/0139717 A1* | 5/2014 | Short | H04N 7/142 |
| | | | 348/333.1 |
| 2014/0271964 A1* | 9/2014 | Roberts, IV | B29C 67/0088 |
| | | | 425/150 |
| 2015/0058782 A1* | 2/2015 | Kutliroff | G06F 3/04815 |
| | | | 715/773 |

OTHER PUBLICATIONS

Shahram Izadi et al., "C-Slate: A Multi-Touch and Object Recognition System for Remote Collaboration using Horizontal Surfaces", 2007, pp. 3-10, IEEE.

Szymon Rusinkiewicz et al., "RealTime 3D Model Acquisition," Feb. 1, 2002, pp. 1-9, Available at: <cs.princeton.edu/~smr/papers/rt_model/rt_model.pdf>.

Weise et al., "Accurate and Robust Registration for In-hand Modeling," Apr. 1, 2008, pp. 1-8, <vision.rwth-aachen.de/.

Weise et al., "In-hand Scanning with Online Loop Closure," 2009 IEEE 12th International Conference on Computer Vision Workshops, Sep. 8, 2009, pp. 1630-1637.

* cited by examiner

OBJECT CAPTURE AND ILLUMINATION

BACKGROUND

Two-dimensional and three-dimensional scanning technology allows for the digital capture or acquisition of the shape, contours, and other features of a physical object. For example, in a three-dimensional scanning application, various hardware and software may be used to create a three-dimensional model of an object scanned by a sensor. Three-dimensional models may be viewed, stored, manipulated, rendered, transmitted, printed, or otherwise utilized in various applications across the consumer, commercial, and industrial sectors.

DETAILED DESCRIPTION

Figure 1:
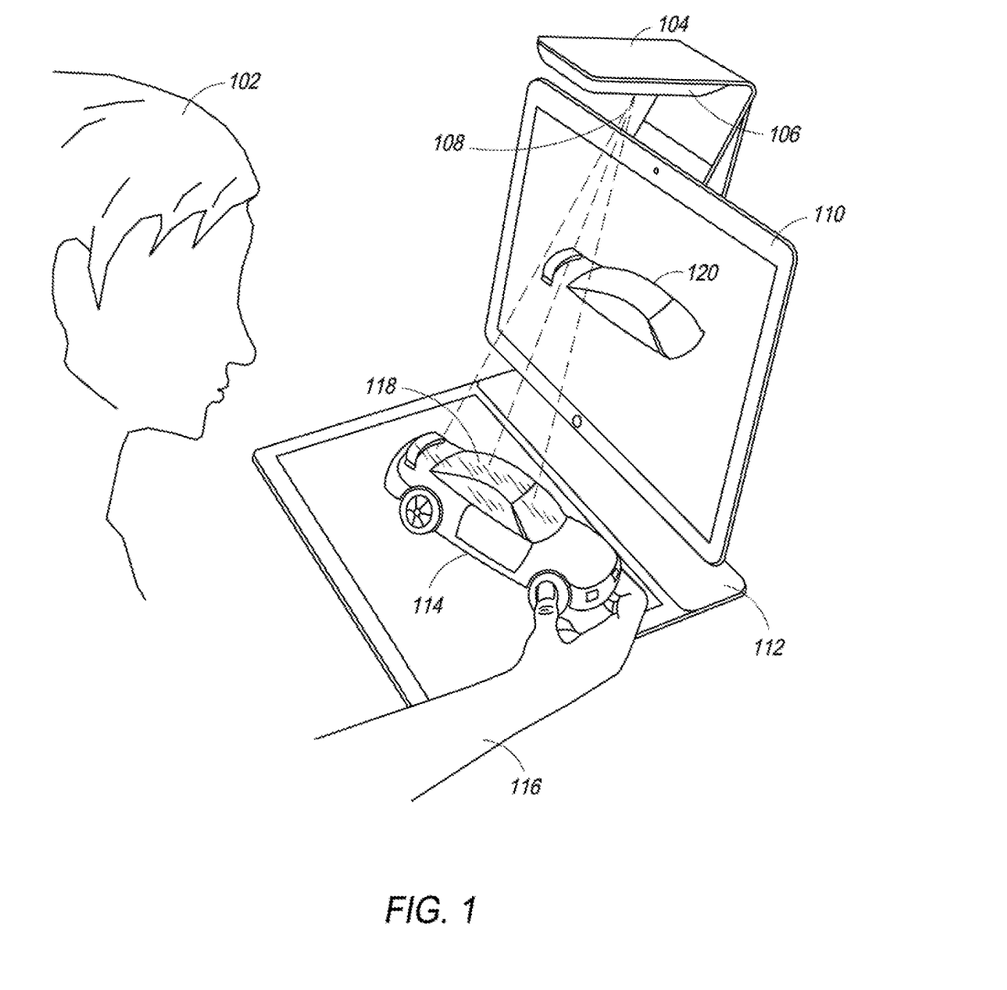
FIG. 1 is a perspective view of an exemplary device and a partially-illuminated object in a first position, according to an example of the present disclosure.

The nature of 2D and, in particular, 3D scanning may result in a user's fingers or arms entering a field of view of a sensor during the scanning and/or rotation of an object. FIG. 1 is a perspective view of an exemplary computer system and/or device and a partially-illuminated object in a first position, according to an example of the present disclosure, where the object is held by a user during a scanning operation. More specifically, in an example, FIG. 1 illustrates a computer system or device 100 ("device") utilized by at least one user 102. As discussed below in more detail, device 100 may comprise a sensor cluster 104, one or more sensors ("sensors") 106, an illumination source 108 or projector assembly or light (hereinafter "illumination"), a display 110, and a touch-sensitive mat 112.

Device 100 may be used to scan an object such as the exemplary three-dimensional object 114, which may be held by a hand 116 (or hands) of user 102 within the field of view of a sensor 106. In some examples, illumination 108 may be used to visually demonstrate the field of view of sensor 106 to user 102, e.g., to provide guidance or feedback to user 102 as to the shape and dimensions of a scanning region such that a user may avoid allowing fingers or arms to enter the scanning region, as discussed below in more detail.

In some examples, a real-time representation of the object 114 being scanned may be displayed on display 110 as, e.g., digital representation or digital object 120. Digital representation 120 may serve as guidance or feedback to user 102 during the process of scanning an object, alone or in combination with illumination 108, as discussed below in more detail.

Device 100 in general may comprise any suitable computing device such as a desktop computer, laptop computer, notebook, netbook, all-in-one computer, tablet, or smartphone capable of interfacing with at least one sensor. Device 100 may comprise a monitor or display 110. In some examples, display 110 may include touch sensitive technology such as resistive, capacitive, acoustic wave, infrared (IR), strain gauge, optical, acoustic pulse recognition, or some combination of such technologies. In some examples, the housing of display 110 may comprise a processor, memory, and/or storage for use in device 100.

Display 110 may also be supported by a support structure (not shown), which may include a base and an upright member. The support structure may support the weight of display 110, as well as sensor cluster 104 and sensors 106, which may be cantilevered such that sensors 106 hover over touch-sensitive mat 112 or a surface suitable for scanning an object. In the example shown in FIG. 1, the front end of the support base includes a portion creating a space or clearance under display 110. In such an example, one side of touch-sensitive mat 112 may be received within the space formed under display 110 to ensure proper alignment of touch-sensitive mat 112. However, it should be appreciated that in other examples, other suitable alignments, methods, or devices may be used.

Touch-sensitive mat 112 may comprise any suitable touch-sensitive technology for detecting and tracking one or multiple touch inputs by a user in order to allow the user to interact with software executed by device 100 or some other computing device (not shown). For example, in some implementations, touch-sensitive mat 112 may utilize known touch sensitive technologies such as those discussed above.

In some examples, touch-sensitive mat 112 and display 110, and/or a processor, memory, and storage of device 100, are electrically coupled to one another such that user inputs received by touch-sensitive mat 112 are communicated to display 110 and/or the processor, memory, and storage housed in display 110 or external to display 110. Any suitable wireless or wired electrical coupling or connection may be used between touch-sensitive mat 112 and display 110, or generally within device 100, such as WI-FI, BLUETOOTH, NFC, ultrasonic, electrical cables, electrical leads, electrical spring-loaded pogo pins with magnetic holding force, or some combination thereof. In an example, exposed electrical contacts disposed on the rear side of touch-sensitive mat 112 engage with corresponding electrical pogo-pin leads within the base of display 110. In some examples, the electrical contacts may be held together by adjacent magnets.

Sensor cluster 104 may comprise one or more sensors 106 and/or one or more illumination sources, such as a projector assembly 108. Illumination source 108 may comprise a suitable digital light projector assembly for receiving data from a computing device and projecting a light, image, or images that correspond with that input data. For example, illumination source 108 may project a beam toward an object being scanned by sensors 106 to visually demonstrate to a user the field of view of a sensor 106. In some examples, the light beam of illumination source 108 may aid a user in ensuring that the user's fingers or arms do not enter the field of view of sensors 106, i.e., that the user's fingers or arms do not enter or cover an area being scanned by sensors 106, such as the exemplary shaded area 118 of object 114 in FIG. 1.

In this example, scanning can be accomplished without, e.g., a turntable system to rotate an object being scanned, and without the need to, e.g., programmatically remove a user's fingers from a digital representation of a scanned object.

In some examples, illumination source 108 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution at a 4:3 aspect ratio, or standard WXGA (1280×800) resolution at a 16:10 aspect ratio.

Illumination source 108 may be electrically coupled to device 100 in order to receive data therefrom for producing light and images during operation. In some examples, illumination source 108 is electrically coupled to device 100 through an electric conductor, WI-FI, BLUETOOTH®, NFC, an optical connection, an ultrasonic connection, or some combination thereof. In the example of FIG. 1, device 100 is electrically coupled to device 100 through electrical leads or conductors that are disposed within the support structure or a mounting.

In some examples, sensor duster 104 may also comprise a folding mirror, which may be a highly reflective surface disposed along a bottom surface of sensor duster 104 and/or positioned to reflect images and/or light projected from a projector, e.g., illumination source 108, toward touch-sensitive mat 112. The mirror may be a standard front surface vacuum metalized aluminum coated glass mirror. In other examples, the mirror may have a complex aspherical curvature to act as a reflective lens element to provide additional focusing power or optical correction. The mirror may allow the illumination source 108 to be located off of the sensor cluster 104, with light reflected from the illumination source 108 onto the mirror of sensor cluster 104, such that illumination will appear to user 102 to be coming from the sensor cluster 104.

Sensors 106 may include a plurality of sensors and/or cameras to measure and/or detect various parameters occurring on or near touch-sensitive mat 112 or other surface suitable for scanning an object. For example, sensors 106 may comprise an ambient light sensor, a camera, a depth sensor, and a three dimensional (3D) user interface sensor.

In an example, an ambient light sensor 106 may be arranged to measure the intensity of light of the environment surrounding device 100 in order to, in some examples, adjust exposure settings of another sensor in sensor cluster 104, and/or adjust the intensity of the light emitted from other sources on device 100 such as, for example, a projector assembly, e.g., illumination source 108, or display 110.

In an example, a camera 106 may comprise a color camera arranged to capture a still image or a video of an object above touch-sensitive mat 200 or on a surface suitable for scanning, or generally in a position below camera 106.

In an example, a depth sensor 106 may indicate when a 3D object is on a work surface, such as touch-sensitive mat 112 or, in other examples, a table or other surface suitable for scanning. In particular, depth sensor 106 may sense or detect the presence, shape, contours, motion, and/or the 3D depth of an object, or specific feature(s) of an object. Thus, in some examples, depth sensor 106 may employ any suitable sensor or camera arrangement to sense and detect a 3D object and/or the depth values of each pixel, whether infrared, color, or other, disposed in the sensor's field of view. In some examples, depth sensor 106 may comprise a single infrared (IR) camera sensor with a uniform flood of IR light, a dual IR camera sensor with a uniform flood of IR light, structured light depth sensor technology, time-of-flight (TOF) depth sensor technology, or some combination thereof.

In an example, a user interface sensor 106 may comprise any suitable device or devices (e.g., a sensor or camera) for tracking a user input device such as, for example, a hand, stylus, or pointing device, etc. In some examples, user interface sensor 106 includes a pair of cameras which are arranged to stereoscopically track the location of a user input device, e.g., a stylus, as it is moved by a user 102 within the field of view of sensors 106. In other examples, user interface sensor 106 may include infrared camera(s) or sensor(s) that are arranged to detect infrared light that is either emitted or reflected by a user input device.

In various examples, sensor cluster 104 may comprise other sensors and/or cameras either in lieu of or in addition to sensors described above, and/or in different configurations such as the configuration discussed in more detail below with respect to FIG. 9.

Sensors 106 in sensor cluster 104, or any sensors 106 accessible by device 100 in general, may be electrically and communicatively coupled to one other and/or device 100 or components of device 100 such that data generated within sensor cluster 104 may be transmitted to device 100, and commands issued by device 100 may be communicated to sensors 106. As explained above for other components of device 100, any suitable electrical and/or communicative coupling may be used to couple sensor duster 104 and sensors 106 to device 100.

During operation of device 100, light 108 may be emitted from illumination source 108, and/or reflected off a mirror in sensor duster 104 from an illumination source 108 located elsewhere, e.g., behind monitor 110. In some examples, the light may be focused toward touch-sensitive mat 112 or other surface below sensor cluster 104. In some examples, as discussed above, the beam of light 108 may aid a user in ensuring that the user's fingers or arms do not enter the field of view of sensors 106, i.e., that the user's fingers or arms do not cover an area being scanned by sensors 106, such as the exemplary shaded area 118 of object 114 in FIG. 1.

In various examples, the beam of light from illumination source 108 may have a fixed length and width. For example, light 108 may have a fixed length equal approximately 16 inches, while the width may equal approximately 12 inches. In some examples, the width may coincide or correspond with the width of touch-sensitive mat 112, or the width of display 110. In some examples, the width of light 108 may be dynamically determined by the field of view of a sensor 106 employed during scanning, or by the size of an object 114 placed under a sensor 106, or by a user selection through software based on, e.g., characteristics or attributes of the object being scanned, the quality of scan desired, and/or the scanning speed desired, etc.

In the example of FIG. 1, light 108 is projected toward object 114 such that the roof, front windshield, and a rear trunk area are illuminated, while the remainder of the object is not illuminated. The light 108 may provide visual guidance or feedback to user 102 as to the area of the object 114 being scanned, e.g., a scanning region 118, such that the user's arms and fingers do not enter the scanning area. In some examples, light 108 may further comprise an image or text within the light, such as the word "SCAN AREA" or other guidance. The position of object 114 in FIG. 1 may be considered a first position, i.e., the position the object is first placed in under sensors 106 when scanning commences.

As the object 114 is scanned, such as by rotation or manipulation by user 102 under sensors 106, a digital object or digital representation 120 of the scanning process may be displayed on display 110. In some examples, the digital representation 120 may be rendered in real-time or near real-time to provide further guidance and feedback to user 102. Digital representation 120 may be rendered by software executing within device 100 on, e.g., a processor, memory, and/or storage. In other examples, data captured by sensors 106 may be transmitted to another device or computer where digital representation 120 is rendered, and then transmitted back to device 100.

In some examples, digital representation 120 may be viewed, stored, manipulated, rendered, transmitted, printed, or otherwise utilized either during the scanning process, or when the scanning process has completed, e.g., when a user has indicated, or the device 100 has determined, that the entire object 114 has been scanned. In some examples, digital representation 120 may be transmitted to a 3D printer, or used to create a 3D printed object.

Figure 2A:
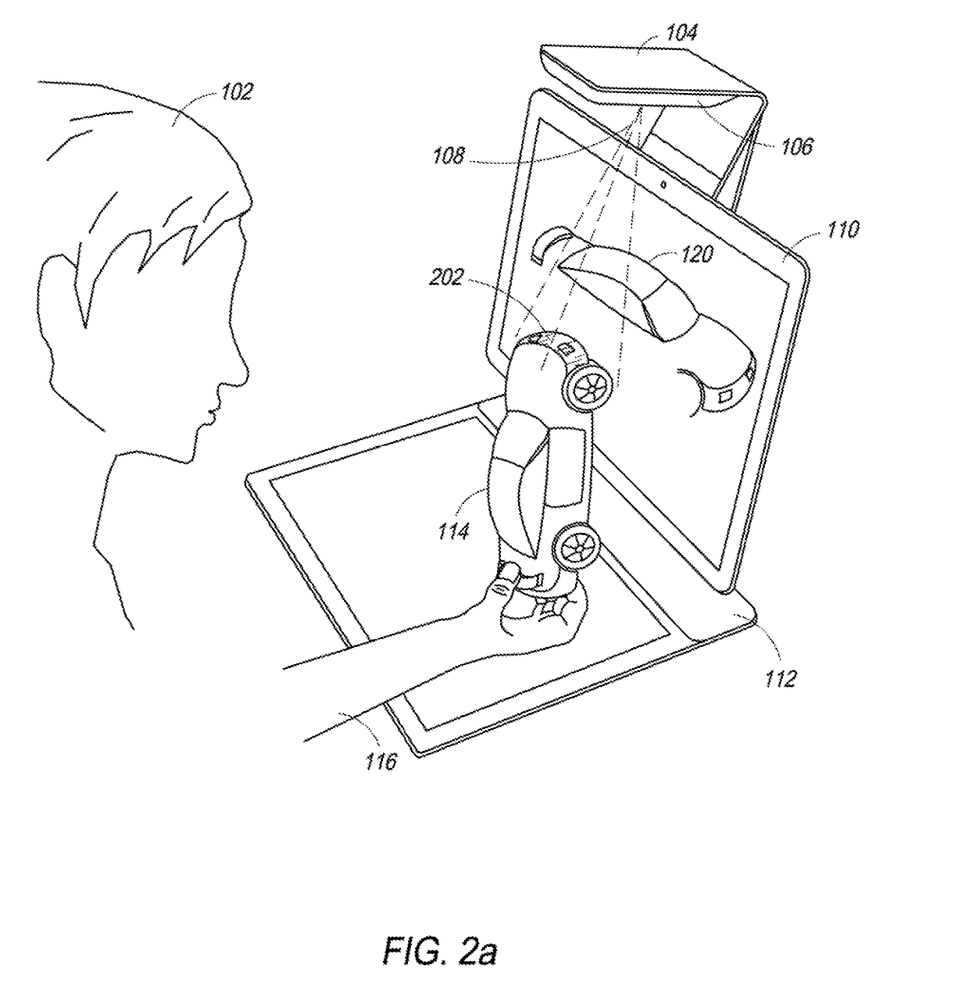
FIG. 2A is a perspective view of an exemplary device and a partially-illuminated object in a second position, according to an example of the present disclosure.

FIG. 2A is a perspective view of an exemplary device and a partially-illuminated object in a second position, according to an example of the present disclosure. In the example of FIG. 2A, the object 114 has been rotated such that the hood, front bumper, and front wheel portions 202 of the object 114 are now illuminated, while the roof, front windshield, and rear trunk area that were previously illuminated in FIG. 1 as areas 118 are no longer illuminated, nor are any other portions of the vehicle. As with FIG. 1, light 108 provides guidance or feedback to user 102, such that the user's fingers and arms 116 remain out of the field of view of sensors 106.

In FIG. 2A, digital representation 120 has been updated to reflect the new portions of the object 114 that are now in the field of view of sensors 106, i.e., the hood, front bumper, and front wheel portions of object 114 that are now illuminated and scanned. In the example of FIG. 2A, the digital representation 120 has remained in the same orientation as when scanning began, i.e., in FIG. 1.

Figure 2B:
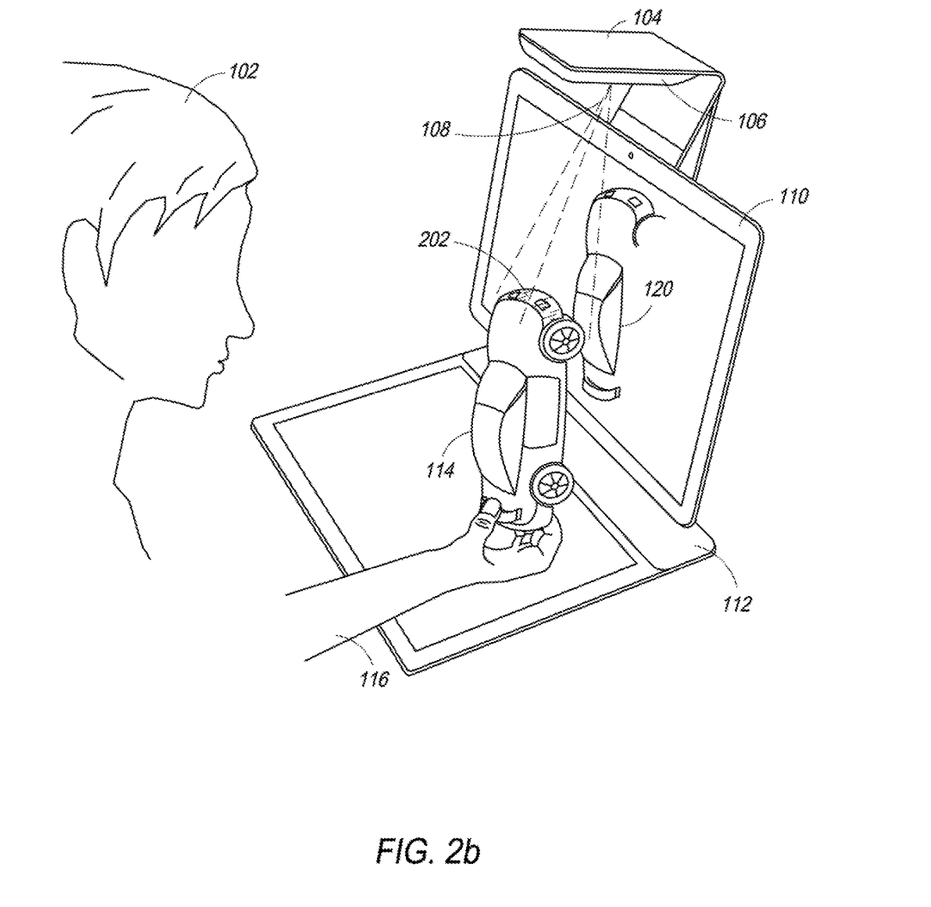
FIG. 2B is a perspective view of an exemplary device and a partially-illuminated object in a second position, according to an example of the present disclosure.

FIG. 2B is a perspective view of an exemplary device and a partially-illuminated object in a second position, according to an example of the present disclosure. In FIG. 2B, as with FIG. 2A, the object 114 has been rotated such that the hood, front bumper, and front wheel portions of the object 114 are now illuminated and the digital representation 120 has been updated to reflect the new portions of the vehicle that are now in the field of view of sensors 106. In FIG. 2B, the digital representation 120 is also rotated such that it appears in the same orientation as the physical object 114. In some examples, a user may be given an option to have the digital representation remain in a stationary orientation during scanning, i.e., as in FIG. 2A, or to follow or track the movement of the physical object 114 during scanning, as in FIG. 2B.

Figure 3:
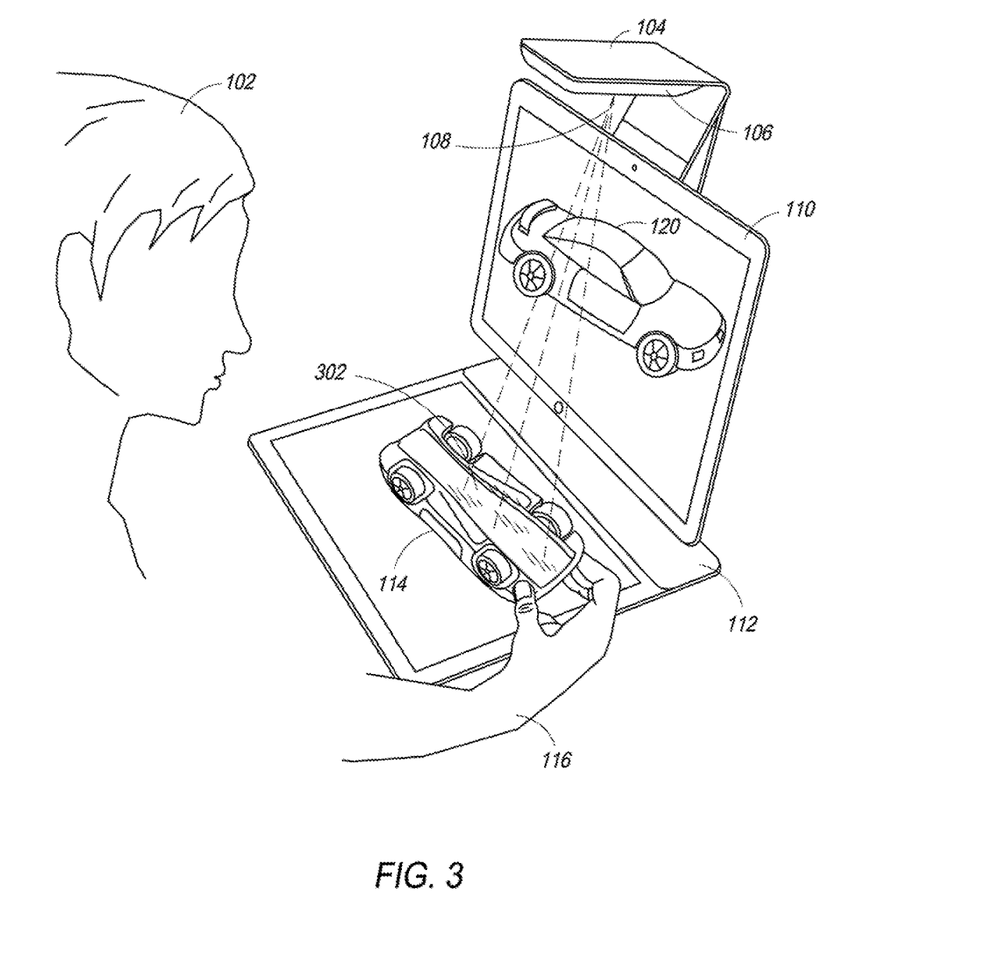
FIG. 3 is a perspective view of an exemplary device and a partially-illuminated object in a third position, according to an example of the present disclosure.

FIG. 3 is a perspective view of an exemplary device and a partially-illuminated object in a third position, according to an example of the present disclosure. In the example of FIG. 3, the object 114 has been rotated again such that portions of the underbody 302 are now illuminated. In the example of FIG. 3, the entire object 114 has now been scanned, and the digital representation 120 is now complete. It will be appreciated that the complete scanning process of object 114 may require additional manipulation and/or rotations not shown in FIG. 3 to allow for the scanning of all sides and/or surfaces of object 114. It will further be appreciated that digital representation 120 may be a three-dimensional model that may be manipulated and/or rotated once a sufficient number of surfaces have been scanned.

Figure 4:
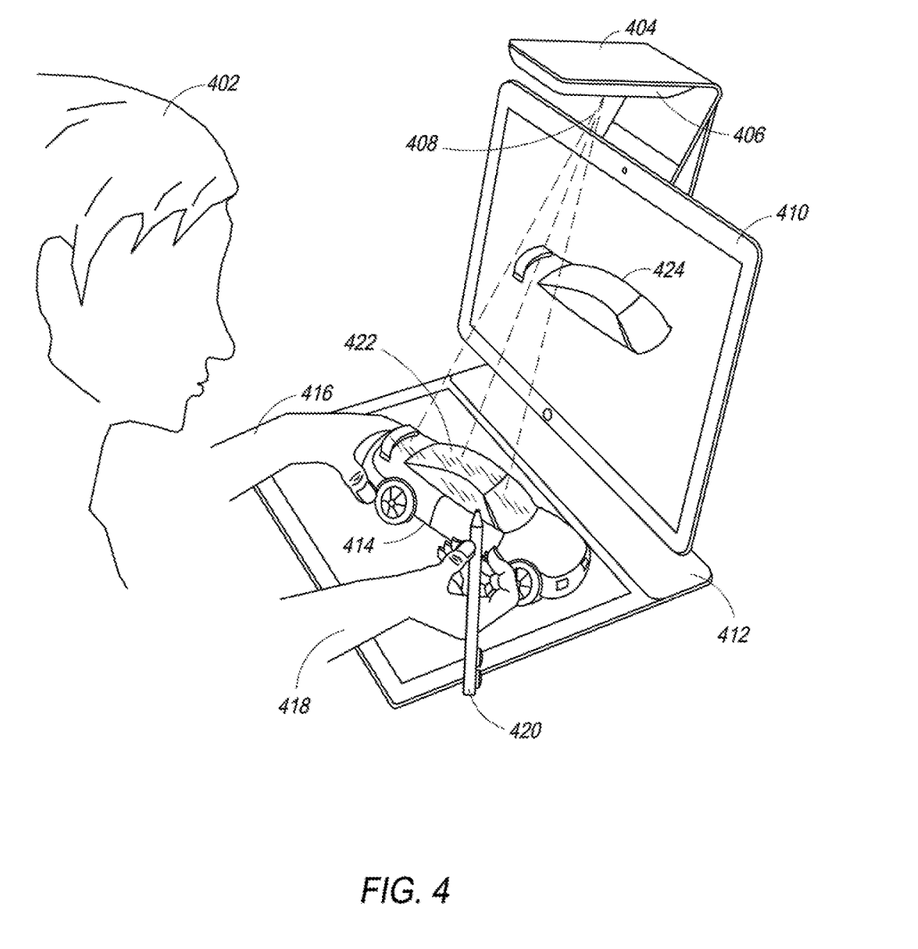
FIG. 4 is a perspective view of an exemplary device, a stylus, and a partially-illuminated object in a first position, according to an example of the present disclosure.

FIG. 4 is a perspective view of an exemplary device, a stylus, and a partially-illuminated object in a first position, according to an example of the present disclosure. As shown above in the example of FIG. 1, light 408 is projected toward object 414 such that the roof, front windshield, and rear trunk area are illuminated, while the remainder of the object is not illuminated. The light 408 provides visual guidance or feedback to user 402 as to the area of the object 414 being scanned. The position of object 414 in FIG. 4 may be considered a first position, i.e., the position the object is first placed in under sensors 406 when scanning commences.

The elements of device 400 in FIG. 4 may mirror that of the device 100 of FIG. 1, with the addition of a pointer device, e.g., a stylus 420. Stylus 420 may be used by sensors 406 to determine which area of object 414 is to be scanned, e.g., by the user 402 pointing the stylus 420 toward the area to be scanned. In some examples, the stylus 420 may be configured to only scan areas of object 414 that fall within the field of view of sensors 406, i.e., the areas of object 414 illuminated by light 408, such that a user may be able to constrain the effective field of view of sensors 406. In some examples, the stylus may "paint" or "swipe" over an area to be scanned, such as an area proximate to the tip of the stylus. In some examples, an area surrounding the painted or swiped area, e.g., within a preset or adjustable tolerance, may be scanned.

Stylus 420 may include a transmitter that is arranged to track the position of stylus 420, whether or not stylus 420 is interacting with object 414, and to communicate with a receiver disposed within device 100 through a wireless signal.

Figure 5:
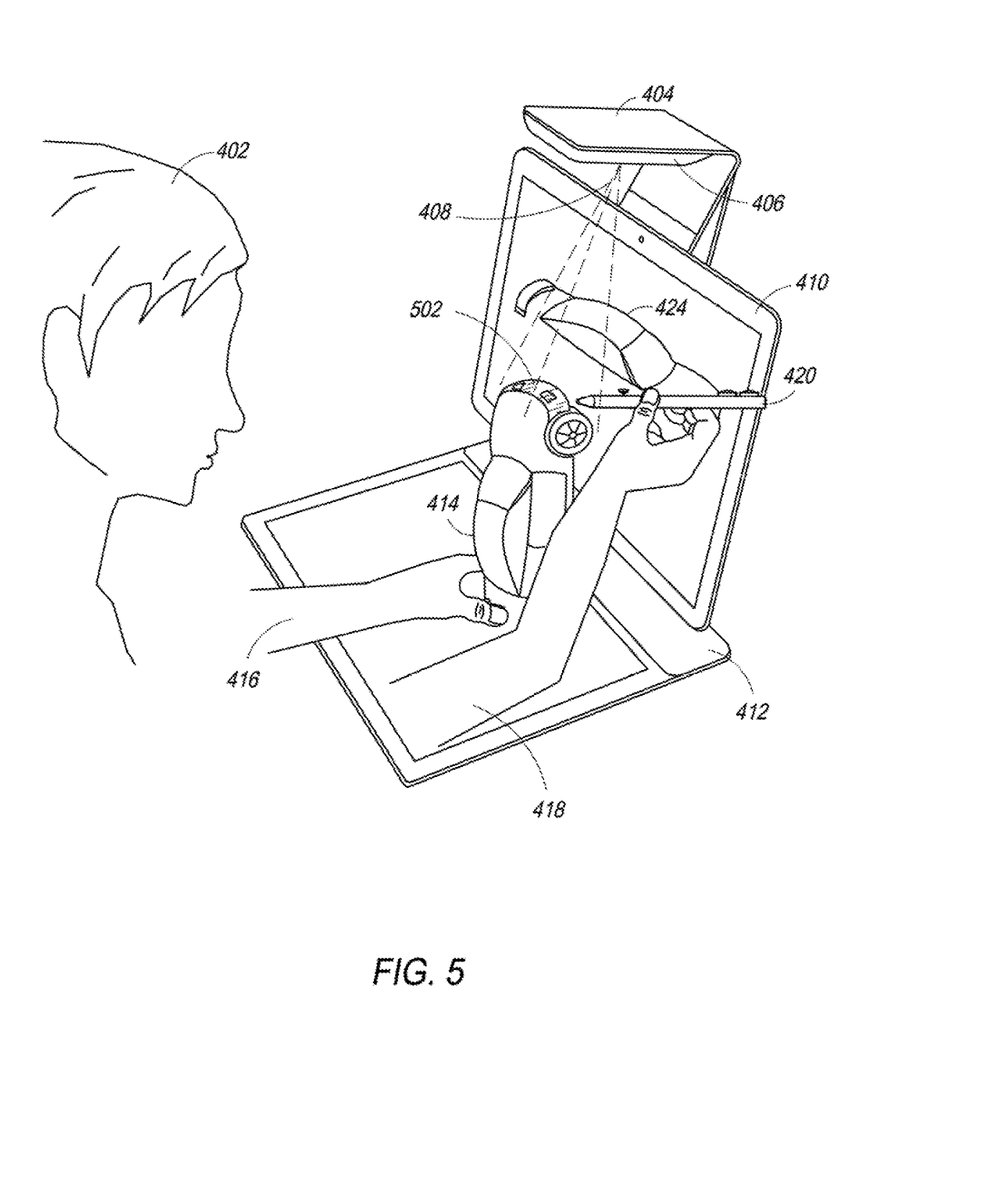
FIG. 5 is a perspective view of an exemplary device, a stylus, and a partially-illuminated object in a second position, according to an example of the present disclosure.
Figure 6:
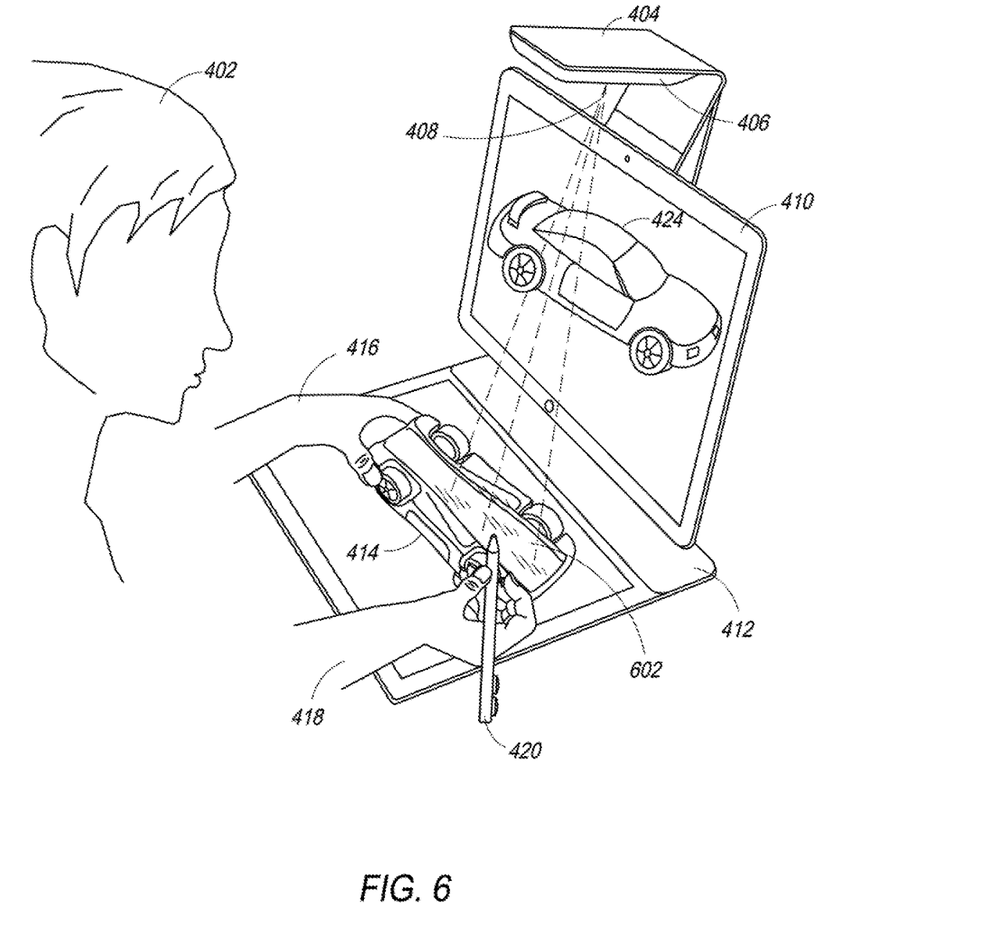
FIG. 6 is a perspective view of an exemplary device, a stylus, and a partially-illuminated object in a third position, according to an example of the present disclosure.

FIG. 5 is a perspective view of an exemplary device, a stylus, and a partially-illuminated object in a second position, and FIG. 6 is a perspective view of an exemplary device, a stylus, and a partially-illuminated object in a third position, according to examples of the present disclosure. As with FIGS. 2 and 3, the object 114 has been rotated again in each of FIGS. 5 and 6 such that other portions of the object 414 are illuminated and scanned. In each of FIGS. 5 and 6, the stylus 420 has also been moved to point to the object surfaces to be scanned by sensors 406.

In the example of FIG. 6, the entire object 414 has been scanned, and the digital representation 420 is complete. As above, it will be appreciated that the complete scanning process of object 414 may require additional manipulation and/or rotations not shown in FIGS. 4-6 to allow for the scanning of all sides and/or surfaces of object 414. It will further be appreciated that digital representation 424 may be a three-dimensional model that may be manipulated and/or rotated.

Figure 7:
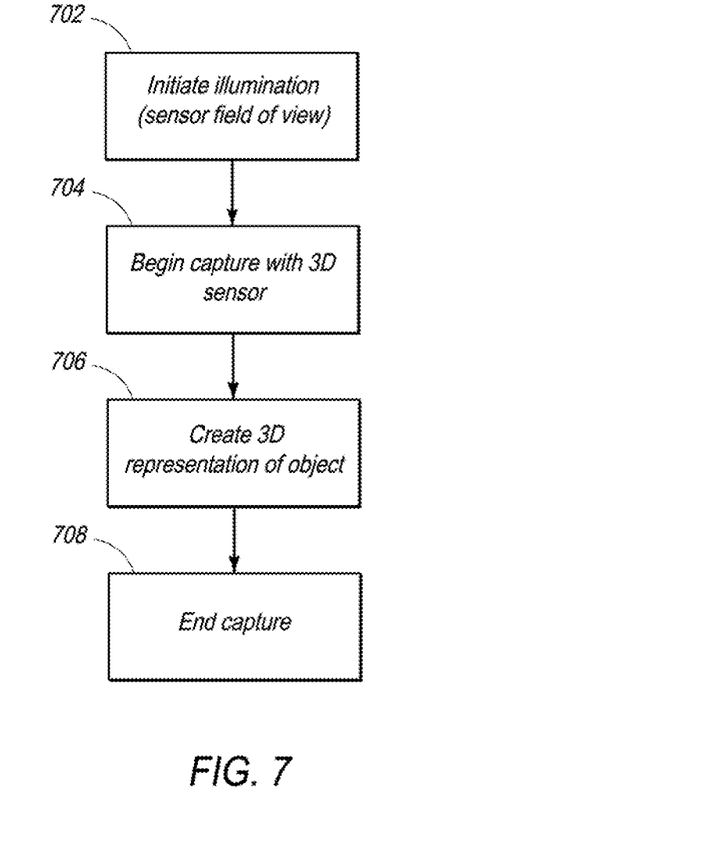
FIG. 7 illustrates a flow diagram of capturing a three-dimensional object, according to an example of the present disclosure.

FIG. 7 illustrates a flow diagram of capturing a three-dimensional object, according to an example of the present disclosure. In block 702, in an example, after an object, e.g., object 114, is placed into the field of view of a sensor, e.g., a 3D sensor or one or more of exemplary sensors 106 on a device 100, illumination is initiated, e.g., from illumination source 108. In an example, illumination may be activated automatically upon sensing that an object has entered the field of view of a sensor on device 100. In another example, a user may be prompted to turn on illumination before or after an object is sensed.

In block 704, 3D scanning commences. As described above with respect to FIGS. 1-6, various sensors, e.g., sensors 106, may be utilized to capture the object within the field of view of sensors 106.

In block 706, a display is updated with visual feedback of the object being scanned, e.g., digital or 3D representation 120. As discussed above, the visual feedback or digital representation 120 may be a three-dimensional model that may be manipulated and/or rotated, and that may be processed on device 100 or on another computer or system.

In some examples, blocks 704 and 706 may loop or continue such that multiple surfaces of an object are scanned. In block 708, once all sides of an object are scanned, or all desired surfaces are scanned, the 3D scanning capture process completes. The captured elements and/or model may be output to, e.g., a file, local memory or local storage, remote or cloud storage, a server, a device, another display, a printer, a 3D printer, or via other electronic means.

Figure 8:
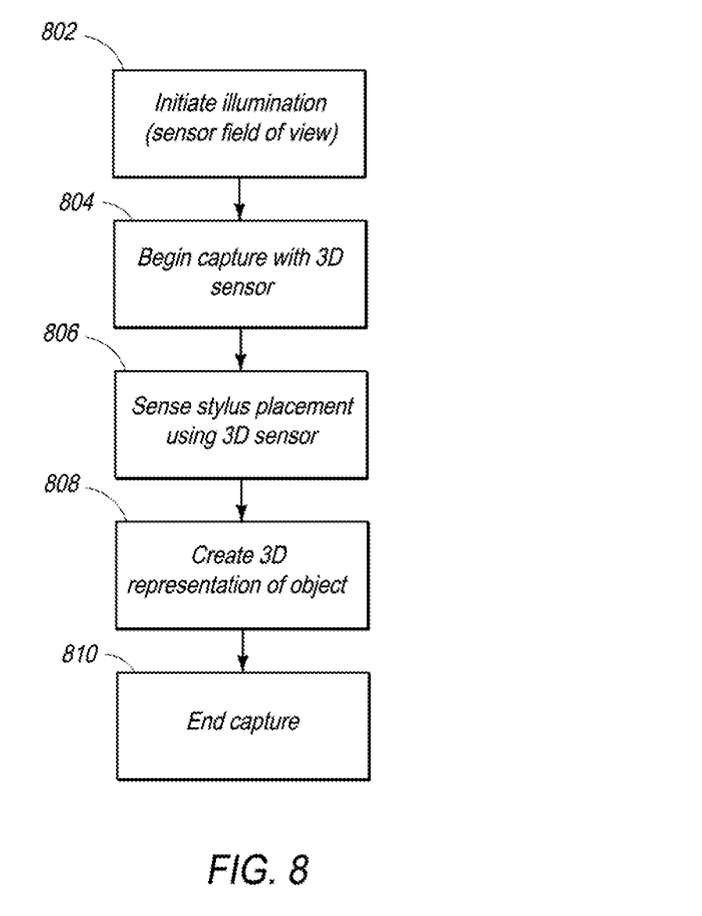
FIG. 8 illustrates a flow diagram of capturing a three-dimensional object using a stylus, according to an example of the present disclosure.

FIG. 8 illustrates a flow diagram of capturing a three-dimensional object using a stylus. The flow of FIG. 8 generally follows the flow of FIG. 7, except that the flow (or in some examples, the loop) of blocks 804 and 808 are determined by block 806, where a stylus is sensed.

As discussed above, stylus 420 may be used by sensors 406 to determine which area of object 414 is to be scanned, by the user 402 pointing the stylus 420 toward the area to be scanned. In some examples, the stylus 420 may be configured to only scan areas of object 414 that fall within the field of view of sensors 406, i.e., the areas of object 414 illuminated by light 408. In the example of FIG. 8, blocks 804 and 808 capture the surfaces of an object illuminated by an illumination source, e.g., light 108, and pointed to by a stylus, e.g., stylus 420, to update the display in block 812.

Figure 9:
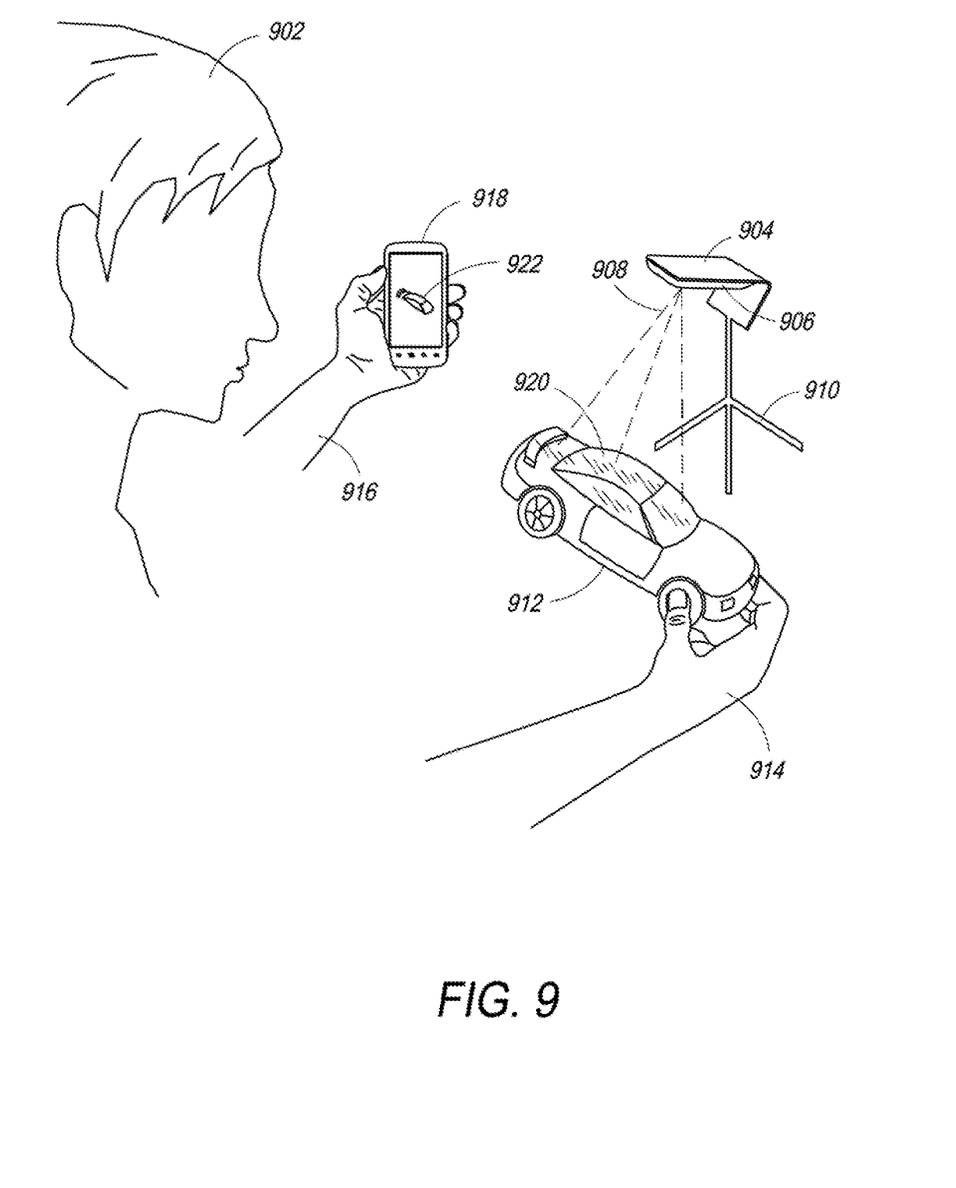
FIG. 9 is a perspective view of an exemplary mobile system and a partially-illuminated object in a first position, according to an example of the present disclosure.

FIG. 9 is a perspective view of an exemplary mobile computer system and a partially-illuminated object in a first position, according to an example of the present disclosure. In various examples, the sensor cluster 104, display 110, and touch-sensitive mat 112 of FIG. 1 may be replaced by, eliminated, or consolidated into other components. For example, a smartphone 918 may be used to display a digital representation 922 of an object being scanned, while a sensor cluster 906 may be mounted on a tripod or otherwise mounted, or hand-held.

Figure 10:
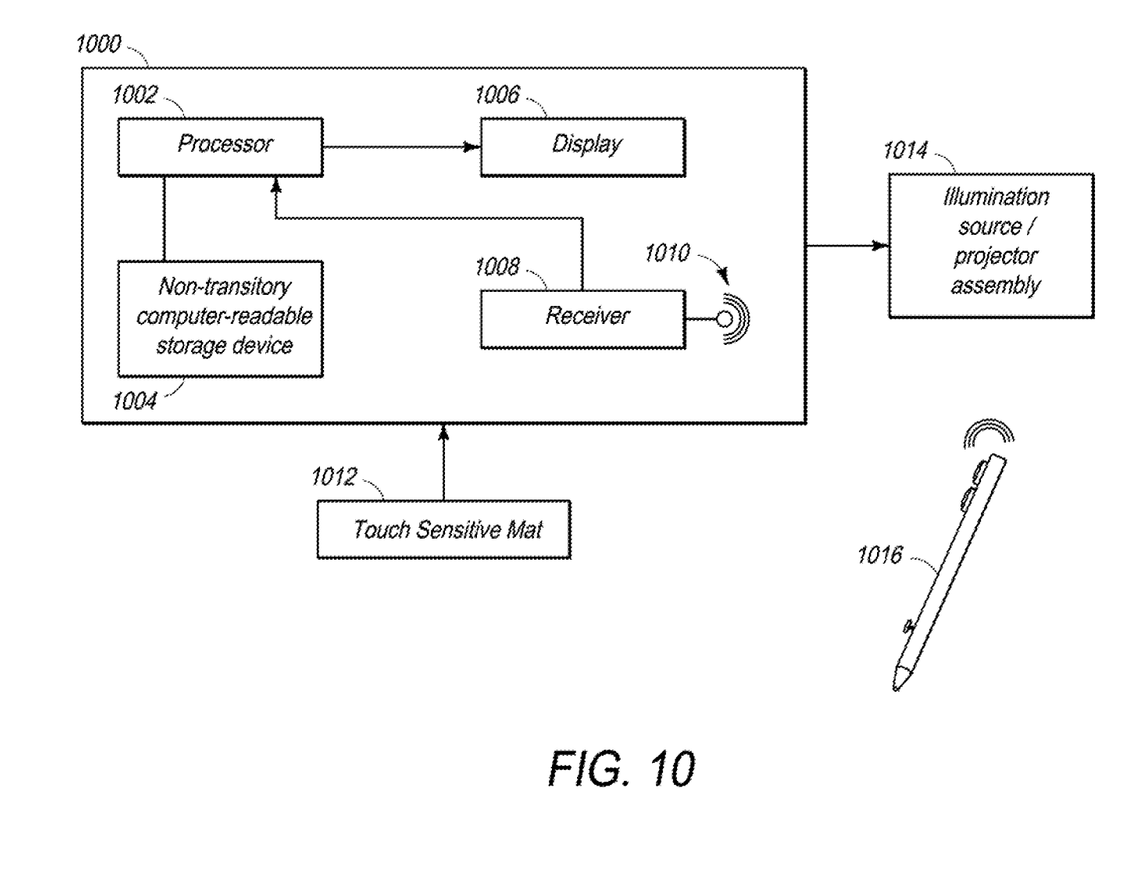
FIG. 10 is a diagram of the exemplary device of FIG. 1, according to an example of the present disclosure.

FIG. 10 is a diagram of the device of FIG. 1, according to an example of the present disclosure. Device 100 may comprise a processor 1002, a non-transitory computer-readable storage device or medium 1004, a display 1006, and a receiver 1008. Device 100 may be coupled to a touch sensitive mat 1012, an illumination source/projector assembly 1014, and a pointer device or stylus 1016.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method performed by a system comprising a hardware processor, comprising:

initiating illumination of an object using light from an illumination source;

scanning the object illuminated by the light with a sensor;

incrementally creating a three-dimensional (3D) representation of the object, comprising:

creating a 3D representation of a first portion of the object responsive to the object being scanned by the sensor while the object is in a first orientation, creating a 3D representation of a second portion of the object responsive to the object being scanned by the sensor while the object is in a second orientation, wherein the first and second orientations are provided based on rotating the object within a field of view of the sensor; and incrementally updating a displayed image of the object while 3D representations of successive portions of the object are created by the incremental creation, wherein incrementally updating the displayed image comprises:

displaying, in a display, a first image based on the 3D representation of the first portion of the object, the first image being in a first display orientation corresponding to the first orientation of the object, and after displaying the first image, displaying, in the display, an updated image based on the 3D representation of the second portion of the object, the updated image being in a second display orientation rotated with respect to the first display orientation according to the rotation of the object within the field of view of the sensor.

2. The method of claim 1, wherein scanning the object with the sensor comprises scanning an illuminated surface of the object.

3. The method of claim 1, further comprising outputting the 3D representation of the object to a 3D printer to print the object.

4. The method of claim 1, wherein scanning the object with the sensor comprises scanning an area of the object proximate to a location of a pointer device.

5. The method of claim 4, wherein the pointer device comprises a stylus.

6. A system, comprising:

a support structure including a base;

a three-dimensional (3D) sensor attached to the support structure;

an illumination source attached to the support structure;

a processor communicatively coupled to the 3D sensor and the illumination source; and a monitor, wherein the illumination source is to project light onto an object to represent a field of view of the 3D sensor, wherein a width of the light from the illumination source is based on the field of view of the 3D sensor, and an illuminated surface of the object as illuminated by the light provides a visual guidance regarding a portion of the object being scanned within the field of view of the 3D sensor, wherein the processor is to incrementally create a 3D representation of the object by:

creating a 3D representation of a first portion of the object responsive to the object being scanned by the sensor while the object is in a first orientation, creating a 3D representation of a second portion of the object responsive to the object being scanned by the sensor while the object is in a second orientation different from the first orientation, wherein the first and second orientations are provided based on rotating the object within the field of view of the 3D sensor, and wherein the processor is to incrementally update a displayed image of the object in the monitor while 3D representations of successive portions of the object are created by the incremental creation of the 3D representation of the object within the field of view, wherein incrementally updating the displayed image comprises:

displaying, in the monitor, a first image based on the 3D representation of the first portion of the object, the first image being in a first display orientation corresponding to the first orientation of the object, and after displaying the first image, displaying, in the monitor, an updated image based on the 3D representation of the second portion of the object, the updated image being in a second display orientation rotated with respect to the first display orientation according to the rotation of the object within the field of view of the 3D sensor.

7. The system of claim 6, wherein the illumination source comprises a projector and mirror assembly.

8. The system of claim 6, wherein the processor is to detect an input from a pointer device swiped across a surface of the object to indicate an area to be scanned by the 3D sensor within the field of view of the 3D sensor.

9. The system of claim 8, wherein the 3D sensor is to track the pointer device.

10. The system of claim 8, wherein the pointer device comprises a stylus.

11. A non-transitory computer readable storage medium comprising instructions that upon execution cause a system to:

initiate illumination of an object using light from an illumination source;

scan the object with a sensor, wherein a width of the light from the illumination source is based on a field of view of the sensor, and an illuminated surface of the object as illuminated by the light provides a visual guidance regarding a portion of the object being scanned within the field of view of the sensor;

incrementally create a three-dimensional (3D) representation of the object, comprising:

creating a 3D representation of a first portion of the object responsive to the object being scanned by the sensor while the object is in a first orientation, creating a 3D representation of a second portion of the object responsive to the object being scanned by the sensor while the object is in a second orientation, wherein the first and second orientations are provided based on rotating the object within the field of view of the sensor; and incrementally update a displayed image of the object while 3D representations of successive portions of the object are created by the incremental creation of the 3D representation of the object, wherein incrementally updating the displayed image comprises:

causing display, in a monitor, of a first image based on the 3D representation of the first portion of the object, the first image being in a first display orientation corresponding to the first orientation of the object, and after displaying the first image, causing display, in the monitor, of an updated image based on the 3D representation of the second portion of the object, the updated image being in a second display orientation rotated with respect to the first display orientation according to the rotation of the object within the field of view of the sensor.

12. The method of claim 1, further comprising:

detecting, by the system, a swipe of a pointer device across a surface of the object;

determining, by the system, an area to scan with the sensor based on the swipe of the pointer device; and capturing, by the system, a scan by the sensor of the area determined from the swipe of the pointer device.

13. The method of claim 1, wherein a width of the light from the illumination source is based on the field of view of the sensor, and an illuminated surface of the object as illuminated by the light provides a visual guidance regarding a portion of the object being scanned within the field of view of the sensor.

14. The system of claim 6, wherein the processor is to:

detect a swipe of a pointer device across a surface of the object;

determine an area to scan with the 3D sensor based on the swipe of the pointer device; and capture a scan by the 3D sensor of the area indicated by the swipe of the pointer device.

15. The method of claim 1, wherein the first display orientation is the same as the first orientation of the object, and the second display orientation is the same as the second orientation of the object.

16. The system of claim 6, wherein the first display orientation is the same as the first orientation of the object, and the second display orientation is the same as the second orientation of the object.

17. The non-transitory computer readable storage medium of claim 11, wherein the first display orientation is the same as the first orientation of the object, and the second display orientation is the same as the second orientation of the object.

* * * * *